United States Patent
Mehrvar et al.

(10) Patent No.: US 10,958,338 B2
(45) Date of Patent: Mar. 23, 2021

(54) SHORT-TERM OPTICAL RECOVERY SYSTEMS AND METHODS FOR COHERENT OPTICAL RECEIVERS

(71) Applicant: Ciena Corporation, Hanover, MD (US)

(72) Inventors: Hamid Mehrvar, Kanata (CA); Salih Jasarevic, Ottawa (CA); Bernard Thiboutot, Gatineau (CA); David Doucet, Almonte (CA)

(73) Assignee: Ciena Corporation, Hanover, MD (US)

( * ) Notice: Subject to any disclaimer, the term of this patent is extended or adjusted under 35 U.S.C. 154(b) by 212 days.

(21) Appl. No.: 14/816,573

(22) Filed: Aug. 3, 2015

(65) Prior Publication Data
US 2015/0358075 A1    Dec. 10, 2015

Related U.S. Application Data

(63) Continuation of application No. 13/216,941, filed on Aug. 24, 2011, now Pat. No. 9,100,116.

(51) Int. Cl.
*H04B 10/03* (2013.01)
*H04B 10/61* (2013.01)
*H04B 10/032* (2013.01)

(52) U.S. Cl.
CPC .......... *H04B 10/03* (2013.01); *H04B 10/032* (2013.01); *H04B 10/6161* (2013.01)

(58) Field of Classification Search
None
See application file for complete search history.

(56) References Cited

U.S. PATENT DOCUMENTS

| | | | |
|---|---|---|---|
| 5,184,243 A * | 2/1993 | Henmi | H04B 10/505 398/147 |
| 7,555,227 B2 | 6/2009 | Bantu et al. | |
| 7,577,366 B2 * | 8/2009 | Way | H04B 10/2525 398/148 |

(Continued)

FOREIGN PATENT DOCUMENTS

| | | |
|---|---|---|
| EP | 2017980 A1 | 1/2009 |
| EP | 2221999 A1 | 8/2010 |

(Continued)

*Primary Examiner* — David W Lambert
(74) *Attorney, Agent, or Firm* — Clements Bernard Walker; Lawrence A. Baratta, Jr.; Christopher L. Bernard

(57) ABSTRACT

Short-term optical recovery systems and methods in coherent optical receivers minimize recovery time for fault scenarios and signal reacquisition while maintaining robust signal acquisition. The short-term optical recovery systems and methods include special techniques and algorithms to minimize recovery time, making coherent systems similar in time as conventional direct detection recovery. The short-term optical recovery systems and methods include an expedited acquisition engine that includes a reference clock recovery, a compensator to remove chromatic dispersion, a burst framer, and a compensator to remove polarization dispersion. Importantly, the expedited acquisition engine uses a memory oriented architecture to allow some properties of the acquisition engine to be stored during initial acquisition and, hence, later on be deployed in any fault scenario to expedite further recovery of a signal.

20 Claims, 6 Drawing Sheets

(56) References Cited

U.S. PATENT DOCUMENTS

| | | | |
|---|---|---|---|
| 7,636,525 B1 * | 12/2009 | Bontu | .................... H04B 10/60 |
| | | | 398/208 |
| 7,684,712 B1 | 3/2010 | Roberts et al. | |
| 7,769,305 B1 | 8/2010 | Roberts et al. | |
| 7,853,157 B2 | 12/2010 | Grigdryan et al. | |
| 7,894,728 B1 | 2/2011 | Sun et al. | |
| 7,899,340 B1 | 3/2011 | Bantu et al. | |
| 2002/0126351 A1 * | 9/2002 | Chung | ................ H04B 10/077 |
| | | | 398/29 |
| 2008/0025728 A1 | 1/2008 | Shpantzer et al. | |
| 2008/0159758 A1 | 7/2008 | Shpantzer et al. | |
| 2008/0187323 A1 | 8/2008 | Honda et al. | |
| 2009/0148164 A1 | 6/2009 | Roberts et al. | |
| 2010/0092181 A1 | 4/2010 | Roberts et al. | |
| 2010/0278528 A1 | 11/2010 | Isomura et al. | |
| 2011/0188866 A1 | 8/2011 | Maeda | |

FOREIGN PATENT DOCUMENTS

| | | | |
|---|---|---|---|
| EP | 2273703 A1 | 1/2011 | |
| WO | 2007045072 A1 | 4/2007 | |
| WO | 2009060526 A1 | 5/2009 | |
| WO | WO 2010150241 A1 * | 12/2010 | ....... H04B 10/07953 |

* cited by examiner

SHORT-TERM OPTICAL RECOVERY SYSTEMS AND METHODS FOR COHERENT OPTICAL RECEIVERS

CROSS-REFERENCE TO RELATED APPLICATIONS

The present patent/application is a continuation of U.S. patent application Ser. No. 13/216,941, filed Aug. 24, 2011, and entitled "SHORT-TERM OPTICAL RECOVERY SYSTEMS AND METHODS FOR COHERENT OPTICAL RECEIVERS," the contents of which are incorporated by reference herein.

FIELD OF THE INVENTION

The present invention generally relates to optical receivers in optical communication systems and methods. More particularly, the present invention relates to short-term optical recovery systems and methods in coherent optical receivers to minimize recovery time for fault scenarios and signal reacquisition through an expedited acquisition engine.

BACKGROUND OF THE INVENTION

Conventionally, optical communication systems and methods have been deployed using intensity-modulated direct detection (IMDD) with a large number of commercial deployments for 10 Gbps. The advantage of IMDD systems is simplicity of transceivers and fast signal acquisition. On the other hand, IMDD systems do not take into account the wave nature of an optical signal. Direct detection is an optical power measuring or photon counting process. The sensitivity of the direct detection process is limited by receiver electronic noise and is de-gradated with respect to the fundamental quantum limit by 10 to 20 dB, hence, scalability of IMDD. The drive for higher performance and high data rate in optical communication systems and methods has renewed interest in coherent detection. Unlike the direct detection, coherent transmission technology uses all the wave aspects of light: amplitude, frequency, and phase of an incoming optical signal. The benefits of coherent detection do not come without a price. Given the amount of signal processing and the complexity of digital processing in an optical coherent system, the time required to recover a signal is much longer than the industry-wide benchmark of 50 msec and much longer than IMDD systems. Accordingly, coherent optical systems and methods require extended signal acquisition time for fault scenarios and signal reacquisition.

BRIEF SUMMARY OF THE INVENTION

In an exemplary embodiment, a method is described, implemented in a coherent optical receiver, to minimize recovery time for fault scenarios and signal reacquisition while maintaining robust signal acquisition. The method includes (a) responsive to detecting a filter error and no loss of light from a traffic carrying state, readjusting a filter associated with the filter error; (b) responsive to detecting a plurality of filter errors and no loss of light, readjusting each of a plurality of filters associated with the plurality of filter errors; (c) responsive to one or more of detecting a loss of light and a failure to solve the filter error or the plurality of filter errors, loading operational data to perform signal reacquisition, wherein the operational data is utilized to speed up the signal reacquisition relative to a full signal reacquisition and the operational data is determined based on the traffic carrying state; and (d) responsive to one or more of detecting a loss of light and a failure of the operational data, performing the full signal reacquisition. The method can further include compensating a digital stream of an optical signal to one or more of recover a reference clock, remove chromatic dispersion, and to remove polarization dispersion, wherein the detecting is during the compensating. The method can further include subsequent to the readjusting in step (a), performing one of recovering back to the traffic carrying state or performing the readjusting in step (b).

The method can further include subsequent to the readjusting in step (b), performing one of (i) recovering back to the traffic carrying state or (ii) performing the loading in step (c) or the full signal reacquisition in step (d). The step (c) can further include, subsequent to the loading operational data: locking a clock, and if unable to achieve a lock, proceeding to the step (d); and performing expedited burst framing, clock realignment, convergence of the plurality of filters, and expedited laser tracking. The step (d) can further include scanning dispersion, performing burst framing, performing clock retuning, performing laser tracking, and performing coefficient tuning for the plurality of filters. The method can further include, subsequent to recovery from the step (d), saving associated data as the operational data. The method can further include switching from one fiber to another fiber and performing the step (c) with the operational data of the another fiber.

In another exemplary embodiment, a coherent optical receiver is described configured to minimize recovery time for fault scenarios and signal reacquisition while maintaining robust signal acquisition. The coherent optical receiver includes a compensation block of electrical circuitry comprising a plurality of filters, wherein the compensation block is configured to receive a stream of digital samples of an optical signal and to provide a compensated stream; and a processor configured to (a) responsive to detection of a filter error and no loss of light from a traffic carrying state, readjust a filter associated with the filter error, (b) responsive to detection of a plurality of filter errors and no loss of light, readjust each of a plurality of filters associated with the plurality of filter errors, (c) responsive to one or more of detection of a loss of light and a failure to solve the filter error or the plurality of filter errors, load operational data to perform signal reacquisition, wherein the operational data is utilized to speed up the signal reacquisition relative to a full signal reacquisition and the operational data is determined based on the traffic carrying state, and (d) responsive to one or more of detection of a loss of light and a failure of the operational data, perform the full signal reacquisition. The processor can be further configured to compensate a digital stream of an optical signal to one or more of recover a reference clock, remove chromatic dispersion, and to remove polarization dispersion, wherein the detecting is during the compensation. The processor can be further configured to subsequent to readjustment in step (a), perform one of recover back to the traffic carrying state or perform the readjustment in step (b).

The processor can be further configured to subsequent to readjustment in step (b), perform one of (i) recover back to the traffic carrying state or (ii) perform step (c) or the full signal reacquisition in step (d). The step (c) can include, subsequent to the operational data being loaded, the processor configured to lock a clock, and if unable to achieve a lock, proceed to the step (d), and perform expedited burst framing, clock realignment, convergence of the plurality of filters, and expedited laser tracking. The step (d) can include the processor configured to scan dispersion, perform burst framing, perform clock retuning, perform laser tracking, and perform coefficient tuning for the plurality of filters. Subsequent to recovery from the step (d), associated data is saved as the operational data. The processor can be further configured to subsequent to a switch from one fiber to another fiber, perform the step (c) with the operational data of the another fiber. The optical signal can be modulated with any of quadrature amplitude modulation (QAM), differential phase shift keying (DPSK), differential quadrature phase shift keying (DQPSK), orthogonal frequency-division multiplexing (OFDM), and polarization multiplexing with any of the foregoing.

In a further exemplary embodiment, a system is described configured to minimize recovery time for fault scenarios and signal reacquisition while maintaining robust signal acquisition in a coherent optical receiver. The system includes electrical circuitry comprising a plurality of filters, wherein the electrical circuitry is configured to receive a stream of digital samples of an optical signal and to provide a compensated stream; wherein the electrical circuitry is configured to perform compensation of the stream of digital samples, detect an error in the compensation, based on a type of the error, perform a recovery associated with the type, wherein the type of the error comprises one of a plurality of error types, and wherein each type of the plurality of error types has a different recovery performed to address a different error, wherein, in at least one of the different recovery utilizes pre-stored operational data to reacquire the optical signal without having to resort to full reacquisition. The pre-stored operational data can be further utilized to reacquire the optical signal subsequent to a switch from one fiber to another. The optical signal can be modulated with any of quadrature amplitude modulation (QAM), differential phase shift keying (DPSK), differential quadrature phase shift keying (DQPSK), orthogonal frequency-division multiplexing (OFDM), and polarization multiplexing with any of the foregoing.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

Figure 1:
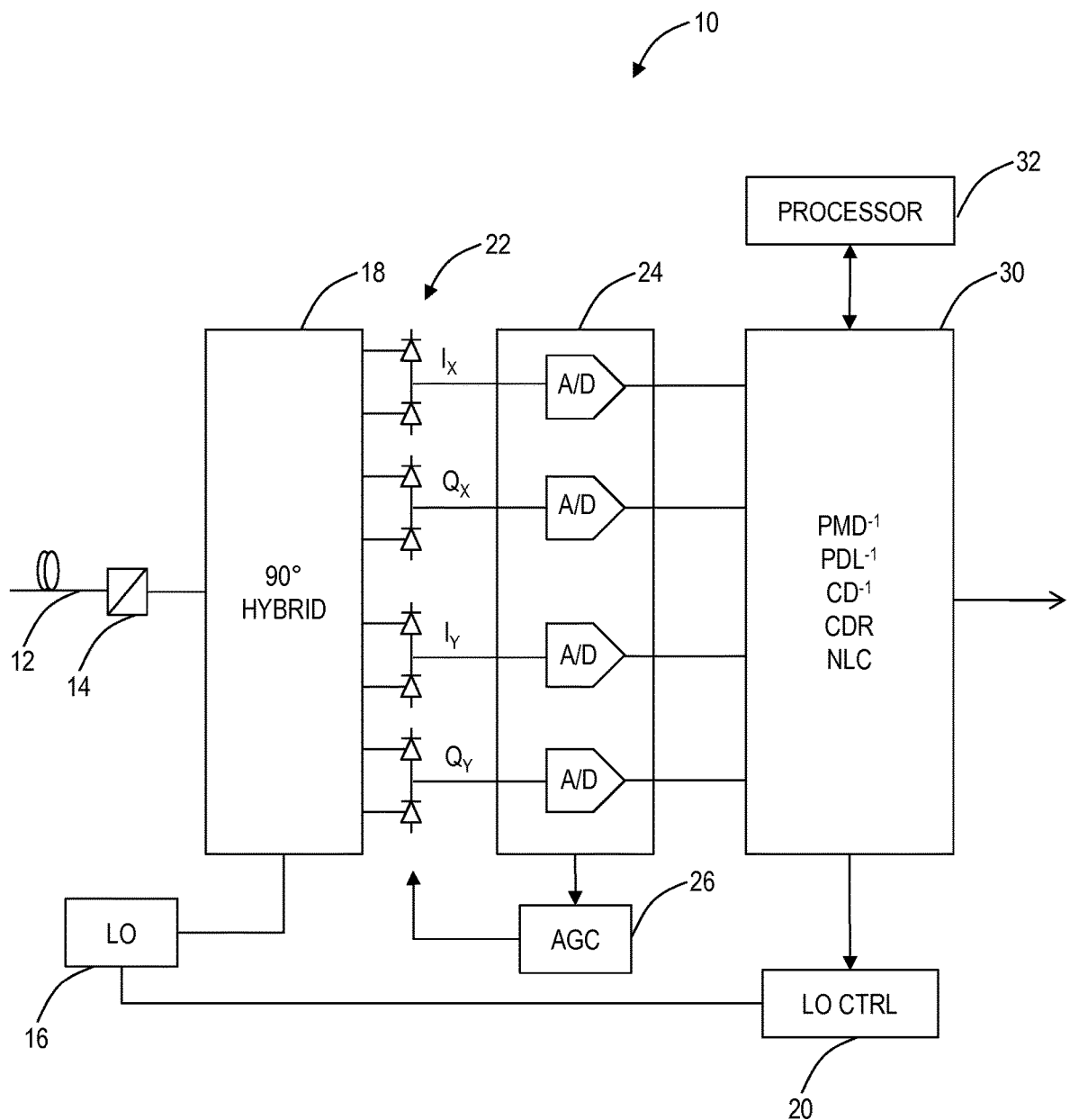
FIG. 1 is a block diagram of an exemplary coherent optical receiver for the short-term optical recovery systems and methods.

In various exemplary embodiments, the present disclosure relates to short-term optical recovery systems and methods in coherent optical receivers to minimize recovery time for fault scenarios and signal reacquisition while maintaining robust signal acquisition. The short-term optical recovery systems and methods include special techniques and algorithms to minimize signal recovery time. The short-term optical recovery systems and methods include an expedited acquisition engine that includes a reference clock recovery, a compensator to remove chromatic dispersion, a burst framer, a compensator to remove polarization dispersion, and the like. Importantly, the expedited acquisition engine uses a memory oriented architecture to allow some properties of the acquisition engine to be stored during initial acquisition and, hence, later on be deployed in any fault scenario to expedite further recovery of a signal. The expedited acquisition engine leverages on a frequency aligned Local Oscillator (LO) as well as pre-calculated dispersion maps and equalizer coefficients.

In an exemplary embodiment, a coherent optical receiver includes electrical compensation circuitry configured to receive an optical signal and to compensate impairments thereon; a Local Oscillator (LO); memory configured to store one or more pre-stored maps of information, wherein the one or more pre-stored maps include multi-dimensional data and are dependent on a protection scheme utilized; and an expedited acquisition engine configured to reacquire the optical signal responsive to a filter error in the electrical compensation circuitry and to reacquire the optical signal responsive to a loss of the optical signal; wherein the expedited acquisition engine is in a traffic carrying state while the optical signal is within normal operating ranges and, when an error or fault occurs, determines a severity of the error or fault and which one of a plurality of recovery levels is to be implemented in order to minimize reacquisition time, wherein each of the plurality of recovery levels addresses a different error or fault and requires a different amount of reacquisition time, the expedited acquisition engine utilizing, in at least one of the plurality of recovery levels, the one or more pre-stored maps to reacquire the optical signal without having to resort to full reacquisition; and wherein the one or more pre-stored maps include at least one of fiber dispersion information, filter coefficients, and frequency offsets for setting the Local Oscillator (LO).

The one or more pre-stored maps can include operational data for an optical fiber used for the optical signal, the operational data stored in the memory in either an online or offline manner. Each of the plurality of levels can be implemented based on the severity of the error or fault. The electrical compensation circuitry can include an equalizer, and wherein a first recovery level of the plurality of recovery levels can be implemented responsive to an error in the equalizer, and the optical signal is reacquired in the first recovery level using a readjustment of the equalizer. The electrical compensation circuitry can include a plurality of equalizers including the equalizer, and wherein a second recovery level of the plurality of recovery levels can be implemented responsive to a plurality of errors in the plurality of equalizers, and the optical signal is reacquired in the second recovery level using readjustments of the plurality of equalizers.

A third recovery level of the plurality of recovery levels can be implemented responsive to a loss of the optical signal for a predetermined time period, and the optical signal is reacquired in the third recovery level using one of the pre-stored maps and readjustments to at least one of the plurality of equalizers, the pre-stored map used related to an optical fiber currently being used by the optical signal. A fourth recovery level of the plurality of recovery levels can be implemented responsive to a loss of the optical signal for a predetermined time period, and the optical signal is reacquired in the fourth recovery level using one of the pre-stored maps and readjustments to at least one of the plurality of equalizers, the pre-stored map used related to a protection optical fiber different from a working optical fiber being used by the optical signal. The one or more pre-stored maps can include multi-dimensional data for a plurality of different optical fibers based on the protection scheme utilized. The coherent optical receiver can be configured in a re-circulation tool including a set of the fiber of a predetermined length with a configuration enabling the optical signal to re-circulate a plurality of times in the set of the fiber.

In another exemplary embodiment, a method includes operating a coherent optical receiver including a Local Oscillator (LO) in a traffic carrying state; detecting an error or fault including any one of a filter error in the electrical compensation circuitry of the coherent optical receiver and a loss of the optical signal; and, responsive to the detecting step, implementing an expedited signal acquisition engine to recover the optical signal in an expedited fashion without having to resort to full reacquisition through the steps of: responsive to detecting the filter error in the electrical compensation circuitry, readjusting one or more equalizers in the coherent optical receiver; and responsive to detecting the loss of the optical signal, loading a pre-stored map and performing an expedited signal acquisition based on the pre-stored map and readjusting the one or more equalizers, wherein the pre-stored map includes multi-dimensional data and is dependent on a protection scheme utilized; wherein, when the error or fault is detected, the expedited signal acquisition determines a severity of the error or fault and which one of a plurality of recovery levels is to be implemented in order to minimize reacquisition time, wherein each of the plurality of recovery levels addresses a different error or fault and requires a different amount of reacquisition time; and wherein the one or more pre-stored maps include at least one of fiber dispersion information, filters coefficients, and frequency offsets for setting the Local Oscillator (LO).

The method can further include if the readjusting and the expedited signal acquisition fail to recover the optical signal, performing a full signal acquisition; and updating the pre-stored map based on the full signal acquisition. The method can further include, prior to operating the coherent receiver, performing a full signal acquisition; and storing data associated with the full signal acquisition in the pre-stored map. The method can further include, if the error includes an error in an equalizer of the one or more equalizers, readjusting the equalizer with the error; and, if the error includes a plurality of errors, readjusting all equalizers of the one or more equalizers in the coherent optical receiver. The method can further include, if the coherent optical receiver is unprotected and responsive to the loss of light, loading the pre-stored map of a working optical fiber; and, if the coherent optical receiver is protected and responsive to the loss of light, loading the pre-stored map of a protection optical fiber. The method can further include populating data in the pre-stored map for the working optical fiber and the protection optical fiber.

In a further exemplary embodiment, a system includes memory; and circuitry coupled to the memory and compensation circuitry in a coherent optical receiver including a Local Oscillator (LO); wherein the circuitry is configured to: store, in the memory, a pre-stored map of operational data, wherein the pre-stored map includes multi-dimensional data and is dependent on a protection scheme utilized; detect an error or fault including any one of a filter error in the compensation circuitry and a loss of light in the coherent optical receiver; and, responsive to the filter error or the loss of light, implement an expedited acquisition engine configured to reacquire a signal using the operational data in an expedited fashion without having to resort to full reacquisition; wherein the expedited acquisition engine is in a traffic carrying state while the signal is within normal operating ranges and, when the error or fault is detected, the expedited signal acquisition determines a severity of the error or fault and which one of a plurality of recovery levels is to be implemented in order to minimize reacquisition time, wherein each of the plurality of recovery levels addresses a different error or fault and requires a different amount of reacquisition time; and wherein the pre-stored maps include any one fiber dispersion information, filters coefficients, and frequency offsets for setting the Local Oscillator (LO).

The circuitry can be configured to, if the error includes an error in an equalizer in the coherent optical receiver, readjust the equalizer with the error; and, if the error includes a plurality of errors, readjust all equalizers in the coherent optical receiver. The circuitry can be configured to, if the coherent optical receiver is unprotected and responsive to a loss of light, load the pre-stored map of a working optical fiber; and if the coherent optical receiver is protected and responsive to a loss of light, load the pre-stored map of a protection optical fiber.

Referring to FIG. 1, in an exemplary embodiment, a block diagram illustrates a coherent optical receiver 10 that may implement the short-term optical recovery systems and methods. An inbound optical signal is received on an optical link 12, split into orthogonal polarizations by a Polarization Beam Splitter (PBS) 14, and mixed with a Local Oscillator (LO) signal 16 by an optical hybrid 18. An LO controller 20 is configured to control a frequency of the LO 16 to minimize frequency mismatch between the LO 16 and a carrier of the inbound optical signal. Composite optical signals output from the optical hybrid 18 are provided to respective photodetectors 22 which generate corresponding analog signals $I_x$, $Q_x$, $I_y$, and $Q_y$, where I is for in-phase, Q for quadrature, and x and y denoting the polarizations. The photodetector 22 signals are sampled by respective Analog-to-Digital (A/D) converters 24 to yield multi-bit digital sample streams. Although two photodetectors 22 are shown for each A/D 24 in FIG. 1, in another exemplary embodiment, only one photodetector can be used for each A/D with satisfactory performance. The A/D converters 24 may include Automatic Gain Control (AGC) 26 that is used to provide feedback to the photodetectors 22.

As may be appreciated, the resolution of the A/D converters 24 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area, and heat generation. It has been found that a resolution of five or six bits provides satisfactory performance, at an acceptable cost. Preferably, the sample rate of the A/D converters 24 is selected to satisfy the Nyquist criterion for the highest anticipated symbol rate of the received optical signal. As will be appreciated, Nyquist sampling ensures that the sample streams generated at the A/D converter output contains all of the information content of each signal, even if the sample timing (with reference to each received symbol) is ambiguous and/or unknown. From the A/D converter 24 block, the I and Q sample streams of each received polarization are supplied to a compensation block 30, which operates on the sample stream(s) to compensate various impairments of the optical link. The compensation block 30 is communicatively coupled to a processor 32 for control thereof. Further, the compensation block 30 is communicatively coupled to the LO control 20 for control thereof.

Since, the coherent optical receiver 10 is sensitive to the phase as well as the amplitude of the optical wave, linear impairments, including Chromatic Dispersion (CD) and Polarization Mode Dispersion (PMD), can be compensated quasi-exactly using adaptive digital filters in the electrical domain. The compensation block 30 and the processor 32 are responsible for Clock and Data Recovery (CDR), compensating for CD, PMD, State of Polarization (SOP), and other Nonlinearity impairment compensations. These functions are performed using equalizers in frequency and/or time domain. That is, the compensation block 30 and the processor 32 are configured to apply electrical domain compensation for various optical impairments to the inbound optical signal. The electrical domain compensation generally includes a multiplication of a system transfer function by an inverse of a nonlinearity. For example, the compensation block 30 may provide PMD compensation, Polarization Dependent Loss (PDL) compensation, CD compensation, CDR, and other Non-Linear Compensation (NLC). Specifically, the compensation block 30 and the processor 32 are configured to receive a stream of digital samples from the A/D converter 24 block and process this stream accordingly to provide a compensated stream. This processing includes adaptive digital filters with coefficients adapted to provide the compensation. Examples of such compensation are described in U.S. Pat. No. 7,555,227 to Bontu et al. issued on Jun. 30, 2009, and entitled "Polarization Compensation in a Coherent Optical Receiver" and U.S. Pat. No. 7,636,525 to Bontu et al. issued on Dec. 22, 2009, and entitled "Signal Acquisition in a Coherent Optical Receiver," the contents of each are incorporated by reference herein.

The compensation block 30 may be any digital electrical circuit such as an Application Specific Integrated Circuit (ASIC), Field Programmable Gate Array (FPGA), and the like. The processor 32 may be any custom made or commercially available processor, a digital signal processor (DSP), a central processing unit (CPU), an auxiliary processor among several processors, a semiconductor-based microprocessor (in the form of a microchip or chip set), or generally any device for executing software instructions. With the compensation block 30 in operation, the processor 32 is configured to execute instructions stored within memory, to communicate data to and from memory, and to generally control operations of the compensation block 30 pursuant to the instructions. Additionally, the compensation block 30 and/or the processor 32 may include memory which may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. The memory may be external or internal to either or both of the compensation block 30 and the processor 32. The memory may be utilized herein to store data such as coefficients, fiber maps, etc. associated with the short-term optical recovery systems and methods.

Given the complexity of the digital processing in the coherent optical receiver 10, signal acquisition takes much longer than IMDD systems and methods and hence poses problems where an expedited signal acquisition is required. In various exemplary embodiments, the short-term optical recovery systems and methods include special techniques and algorithms to minimize recovery time for both fault scenarios and signal re-acquisition while maintaining robust signal acquisition. The short-term optical recovery systems and methods include an expedited acquisition engine that includes a reference clock recovery, a compensator to remove chromatic dispersion, a burst framer, a compensator to remove polarization dispersion, and the like. Importantly, the expedited acquisition engine uses a memory oriented architecture to allow some properties of the acquisition engine to be stored during initial acquisition and, hence, later on be deployed in fault scenarios or signal reacquisition to expedite further recovery of a signal. The expedited acquisition engine leverages on a frequency aligned LO 16 as well as pre-calculated dispersion maps and equalizer coefficients. That is, the compensation block 30 and the processor 32 may include the memory with properties, configurations, settings, etc. stored therein and adapted for use by the expedited acquisition engine.

The compensation block 30, for example, may include a PMD compensator which is implemented through a plurality of equalizers in the time domain. Each of the plurality of equalizers may include one or more filters, and each of the plurality of equalizers may include a plurality of coefficients which are used to compensate for PMD. The compensation block 30 may also include a CD compensator which is implemented through a plurality of equalizers in the frequency domain. Similarly, each of the plurality of equalizers may include one or more filters, and each of the plurality of equalizers may include a plurality of coefficients which are used to compensate for CD. In an exemplary embodiment, the expedited acquisition engine may be utilized to leverage a priori knowledge of coefficients for the plurality of equalizers to provide faster signal acquisition. Further, the expedited acquisition engine may isolate errors to a particular equalizer and focus solely on the adjustment of coefficients in the particular equalizer opposed to readjustments across all equalizers. Also, the CD equalizers may be stored and reloaded to initialize the CD equalizers to known settings.

The coherent optical receiver 10 is configured to demodulate a Polarization Multiplexed (POL-MUX) Differential Quadrature Phase Shift Keyed (DQPSK) and/or Binary Phase Shift Keyed (BPSK) signal. The short-term optical recovery systems and methods contemplate use with any type of coherent optical system including, but not limited to, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. Further, those of ordinary skill in the art will recognize the coherent optical receiver 10 may include other components which are omitted for simplicity, and that the systems and methods described herein are contemplated for use with a plurality of different coherent optical receivers with the coherent optical receiver 10 presented as an exemplary type of receiver.

Advantageously, coherent optical systems offer improved receiver sensitivity, increased transmission rate and increased spectral efficiency relative to convention IMDD systems and methods. Coherent detection can provide receiver sensitivity improvement of 4 to 20 dB, such as for example, with the LO 16 approximately centered on the signal's frequency band, a 4.3 dB improvement in noise tolerance over traditional direct detection is achieved. Coherent systems implement amplitude, frequency, and phase modulation to transmit information allowing increase transmission rates via advanced modulation techniques which use multiple bits per symbol (baud). The spectral selectivity characteristic of a coherent receiver allows further capacity scaling using coherent de-multiplexing of multiple carriers. As a result, one can overlay 40 G/100 G/beyond on an old 10 G IMDD, and benefit from increased spectral efficiency with minimal network investment.

Figure 2:
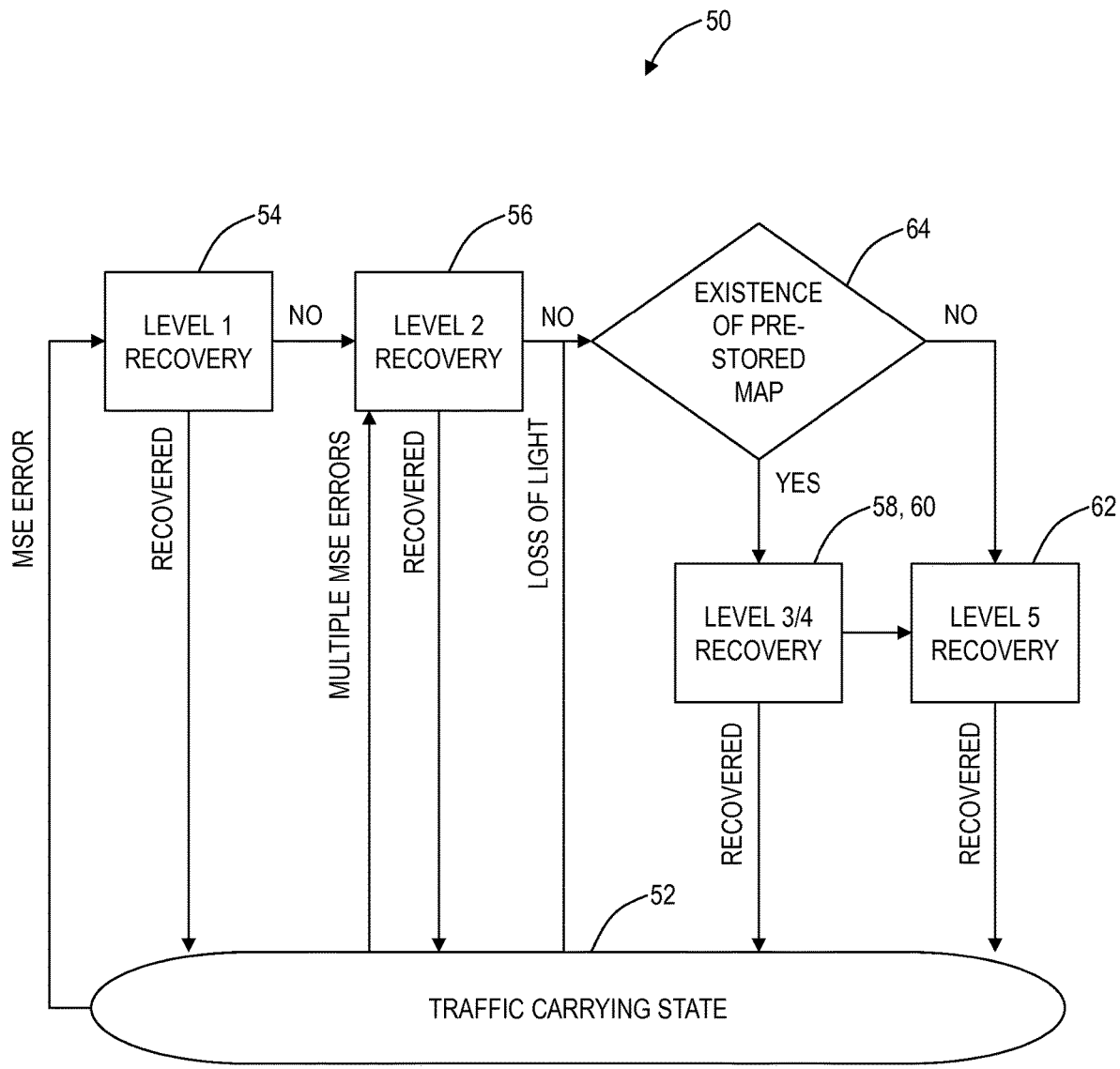
FIG. 2 is a flowchart of an expedited acquisition engine for the short-term optical recovery systems and methods.

Referring to FIG. 2, in an exemplary embodiment, a flowchart illustrates an expedited acquisition engine 50 for the short-term optical recovery systems and methods. Specifically, the expedited acquisition engine 50 may be implemented via the compensation block 30 and/or the processor 32. In an exemplary embodiment, assume the compensation block 30 includes a plurality of equalizers and a Least Mean Squares (LMS) algorithm or another adaptive filtering algorithm is utilized to optimize coefficients associated with the plurality of equalizers. Any fault, error, etc. results in a Mean Squared Error (MSE) thereby requiring signal recovery. The expedited acquisition engine 50 for the coherent optical receiver 10 includes a plurality of levels of recovery depending on the status of the light in the coherent optical receiver 10 and the duration of the fault. Through the use of the plurality of levels, the expedited acquisition engine 50 seeks to recover signal acquisition in an expedited fashion without having to resort to full reacquisition which may require extended time in a coherent system. In this exemplary embodiment, the expedited acquisition engine 50 is illustrated with five levels, but the expedited acquisition engine 50 may include additional levels not described herein. For example, additional levels not shown may be utilized to address specific faults experienced by the compensation block 30.

During normal operation, the expedited acquisition engine 50 is in a traffic carrying state 52. Here, the coherent optical receiver 10 is receiving the inbound optical signal and the compensation block 30 is providing compensation accordingly with an output within accepted operating ranges. At some point during the normal operation in the traffic carrying state 52, the coherent optical receiver 10 experiences a fault, error, etc. If there is no loss of light in the coherent optical receiver 10, but an MSE error occurs with a failure in one of the parallel equalizers in the compensation block 30, the coherent optical receiver 10 enters a Level 1 recovery state 54. In the Level 1 recovery state 54, the expedited acquisition engine 50 is configured to adjust a single equalizer in the compensation block 30. That is, the MSE error will cause signal degradation, but likely will not cause loss of signal or bit errors due to forward error correction (FEC). The expedited acquisition engine 50 performs an adjustment of phase on the failed equalizer rather than requiring signal reacquisition of the entire compensation block 30. In an exemplary embodiment, the Level 1 recovery state 54 performs a reburst frame for the failed equalizer with a burst frame coming out of the failed equalizer. The Level 1 recovery state 54 reframes on the burst frame and adjusts the failed equalizer accordingly while other equalizers are maintained without adjustment.

Upon performing the Level 1 recovery state 54, the expedited acquisition engine 50 may return to the traffic carrying state 52 if there is a recovery. If not, the expedited acquisition engine 50 enters a Level 2 recovery state 56. Additionally, the expedited acquisition engine 50 may enter the Level 2 recovery state 56 directly if there is initially multiple MSE errors. In particular, the Level 2 recovery state 56 assumes multiple failed equalizers and proceeds to adjust all of the equalizers in a manner similar to the Level 1 recovery state 54 but on all of the equalizers in the compensation block 30. The Level 2 recovery state 56 assumes there is no loss of light, but there are multiple MSE errors with failures in more than one of the parallel equalizers. The Level 2 recovery state 56 proceeds to reframe and reconverge all of the equalizers. Both the Level 1 recovery state 54 and the Level 2 recovery state 56 adjust for equalizers associated with fast effects, i.e. PMD, PDL, etc., and not CD or LO CTRL 20, which are slower effects. Further, failures in these equalizers typically will lead to bit errors in the correction block 30 that may be corrected via FEC.

If the Level 1 recovery state 54 and the Level 2 recovery state 56 did not solve the problem, the expedited acquisition engine 50 enters a Level 3 Recovery state 58 for an unprotected system, a Level 4 Recovery state 60 for a protected system, or a Level 5 Recovery state 62 if there is no pre-stored map (step 64). Alternatively, the expedited acquisition engine 50 may directly enter the Level 3 Recovery state 58, Level 4 Recovery state 60, or the Level 5 Recovery state 62 if there is a loss of light. Details of the Level 3 Recovery state 58 and the Level 4 Recovery state 60 are illustrated in a flowchart in FIG. 3. Both the Level 3 Recovery state 58 and the Level 4 Recovery state 60 assume there is a pre-stored map in the compensation block 30 and/or the processor 32. The pre-stored map includes coefficient settings, fiber settings, etc. that are pre-stored at some prior time when the coherent optical receiver 10 was in the traffic carrying state 52 or upon entering the traffic carrying state 52. That is, the pre-stored map is utilized to enable faster signal reacquisition as opposed to starting from the beginning with a full acquisition. The Level 3 Recovery state 58 and the Level 4 Recovery state 60 perform the same functions with the difference being the Level 3 Recovery state 58 is for an unprotected link, i.e. signal reacquisition on the same optical fiber, and the Level 4 Recovery state 60 is for a protected link, i.e. signal reacquisition on a different or protection optical fiber. In this way, the Level 3 Recovery state 58 can be referred to as a single-dimensional recovery whereas the Level 4 Recovery state 60 is a multi-dimensional recovery.

The Level 3 recovery state 58 is entered upon an MSE error or multiple MSE errors due to a loss of light for a predetermined time period, i.e. T msec. The expedited acquisition engine 50 loads a pre-stored map which is pre-populated either on-line during initial acquisition (e.g., during System Line Up and Test (SLAT)) or off-line using defined procedures (e.g., via a network management system or the like communicatively coupled to the processor 32). The Level 3 recovery state uses the information inside the pre-stored map to perform an expedited acquisition for a non-protected line. The pre-stored map information includes, but not limited to, fiber dispersion information, filter coefficients, and laser frequency offsets for the link. The value of T is programmable as it is application specific. It could be set to tens of msec or hundreds or thousands of msec. It is limited by an amount of time during which frequency drifting of LO may be tolerated for successful line recovery. Typically it's in order of tens of seconds. If shortly after T msec blackout time, the signal does not recover, and then the expedited acquisition engine 50 enters the Level 5 Recovery state 62.

The Level 4 Recovery state 60 is entered upon similarly to the Level 3 recovery state 58, but where there is another fiber for which signal reacquisition is required. For example, the coherent optical receiver 10 may be switched via some protection mechanism to another optical fiber. The Level 4 Recovery state 60 loads the pre-stored map of the protected path and proceeds to the expedited acquisition. The pre-stored map includes, but not limited to, fiber dispersion information, filter coefficients, and laser frequency offsets for each of the protected link. This means that the pre-stored map content is multi-dimensional depending on the protection scheme (1+1, 1:N, N:M, etc.). In particular, the expedited acquisition engine 50 is configured to store the pre-stored map for multiple fibers associated with the coherent optical receiver 10. This may be done via initial acquisition during SLAT for the multiple fibers or via other coherent optical receivers 10 on the different fibers and sharing of the data therebetween. The value of T is programmable as it is application specific. It could be set to tens of msec or hundreds or thousands of msec. It is limited by an amount of time during which frequency drifting of LO may be tolerated for successful line recovery. If shortly after T msec blackout time, the signal does not recover, and then the expedited acquisition engine 50 enters the Level 5 Recovery state 62.

The Level 5 Recovery state 62 provides a base level for signal reacquisition. The Level 5 Recovery state 62 not only provides the initial pre-stored map for the aforementioned levels but also ensures robustness of the acquisition in case of failure in any of the previous levels. For unprotected path, the Level 5 Recovery state 62 performs a full acquisition and stores/updates the map information (a single dimension) for the first time. A next blackout situation will use the pre-stored map for expedited recovery. For protected path(s), the Level 5 Recovery state 62 performs full acquisition for each path and stores/updates the information for each path (multi-dimensional). It is noted that the population of this pre-stored map can be done in either on-line or off-line basis. If performed by expedited acquisition engine 50 it is considered to be on-line. The off-line mechanism assumes having a prior knowledge of the link based on mathematical modeling. Also, the population may be done via information sharing between a plurality of coherent optical receivers 10.

Advantageously, the various levels provide a mechanism for expedited signal reacquisition that may reduce the signal recovery to sub msec or a few msec. For example, the Level 1 recovery state 54 may require a msec or less for recovery, the Level 2 recovery state 56 may require several msec, and so on with the Level 5 recovery state 62 requiring a few secs. The Level 5 recovery state 62 is performed upon initial installation, and it saves the pre-stored map. For subsequent failures, the other levels provide a faster reacquisition time. For example, a pinch of the fiber or crimp of the fiber may cause the expedited acquisition engine 50 to enter the Level 1 recovery state 54 rather than requiring complete reacquisition. A quick pull of the fiber, e.g. 2 sec., may only require the Level 3 recovery state 58 which converges in tens of msec. Thus, the expedited acquisition engine 50 includes the following functionality such as storing and loading the pre-stored map; burst reframing or framing based on dispersion information and stored frequency offsets in the pre-stored map; clock re-alignment based on dispersion information in the pre-stored map; re-convergence of the equalizers based on dispersion information, frequency offsets, and filters coefficients; and the like.

Figure 3:
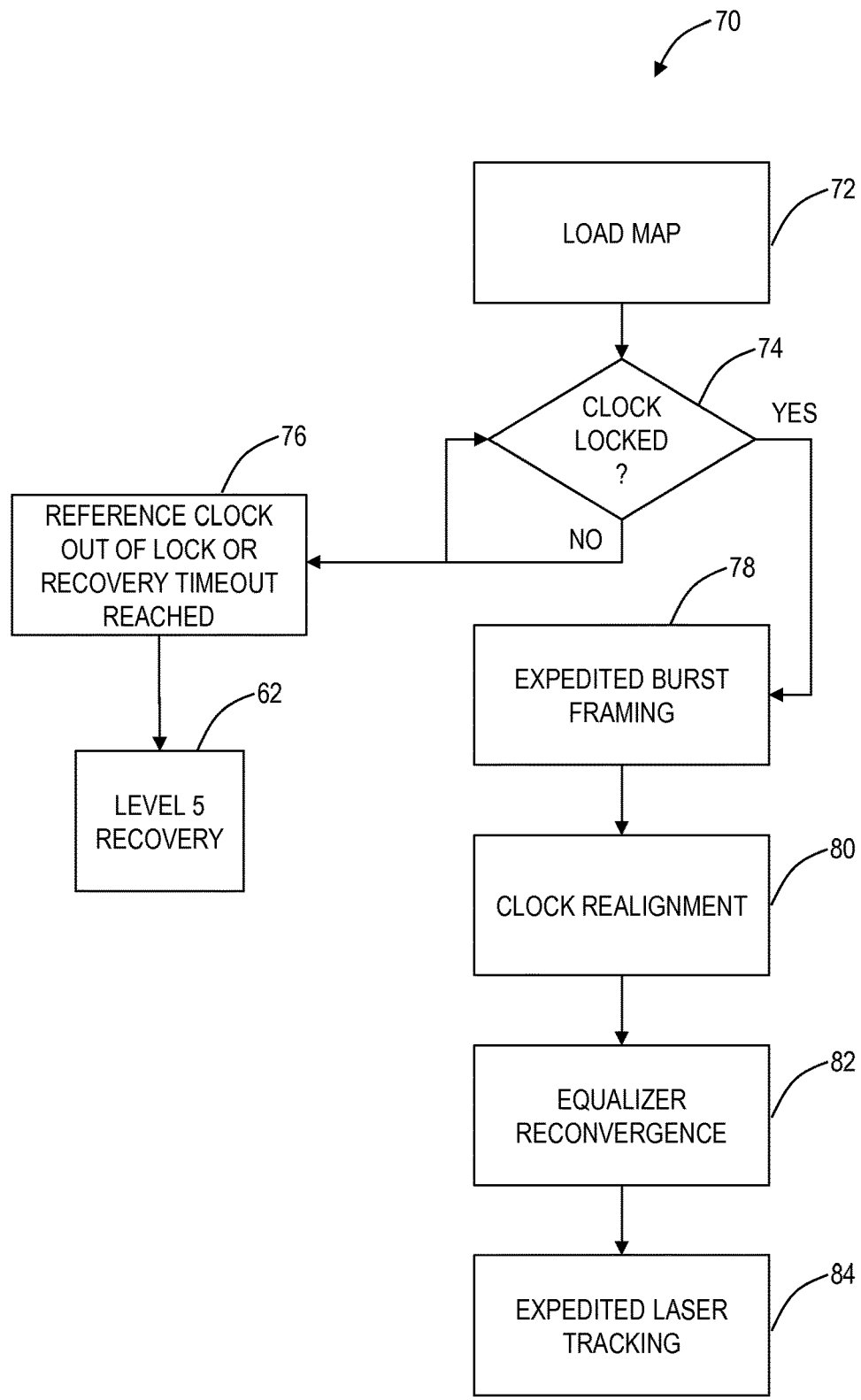
FIG. 3 is a flowchart of a Level 3 recovery state and a Level 4 recovery state for the expedited acquisition engine of FIG. 2.

Referring to FIG. 3, in an exemplary embodiment, a flowchart illustrates exemplary operations 70 in the Level 3 Recovery state 58 and the Level 4 Recovery state of the expedited acquisition engine 50. First, the pre-stored map is loaded (step 72). Here, the expedited acquisition engine 50 loads the pre-stored map from the memory of the compensation block 30 or the processor 32. The expedited acquisition engine 50 proceeds to lock a clock (step 74). The clock may include a two-stage clock including a reference clock and a line clock. If the reference clock is out of lock or a recovery timeout is reached without locking the clock (step 76), then the expedited acquisition engine 50 enters the Level 5 recovery stage 62. Once the line clock is locked, the expedited acquisition engine 50 performs expedited burst framing (step 78). Next, the expedited acquisition engine 50 performs clock realignment (step 80) followed by equalizer reconvergence (step 82) and expedited laser tracking (step 84) using the pre-stored map.

Figure 4:
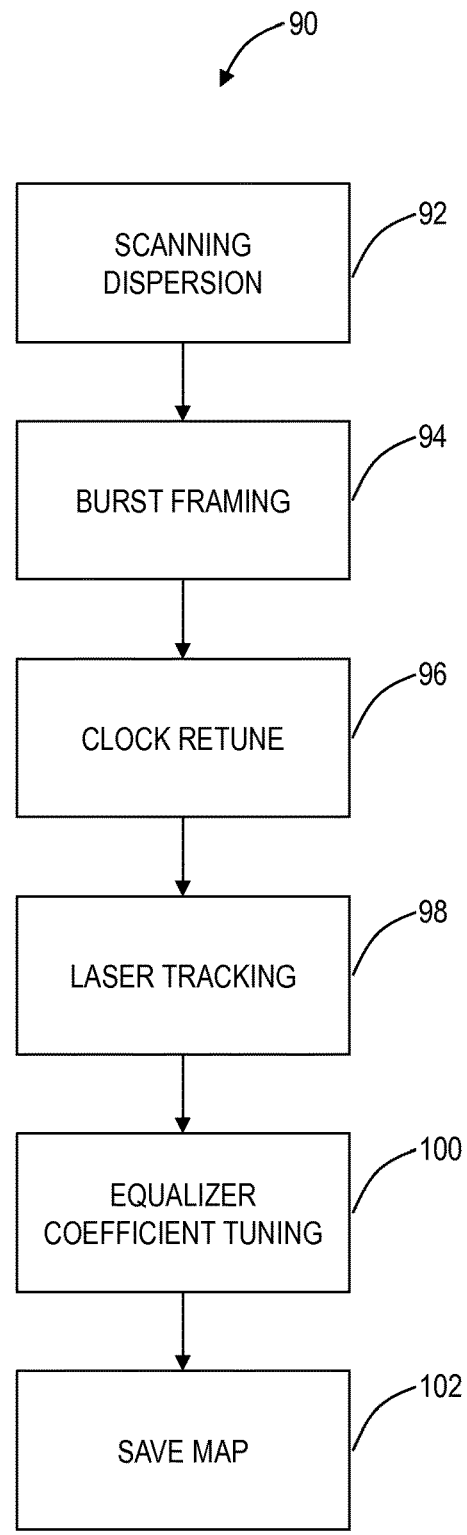
FIG. 4 is a flowchart of a Level 5 recovery state for the expedited acquisition engine of FIG. 2.
Figure 5:
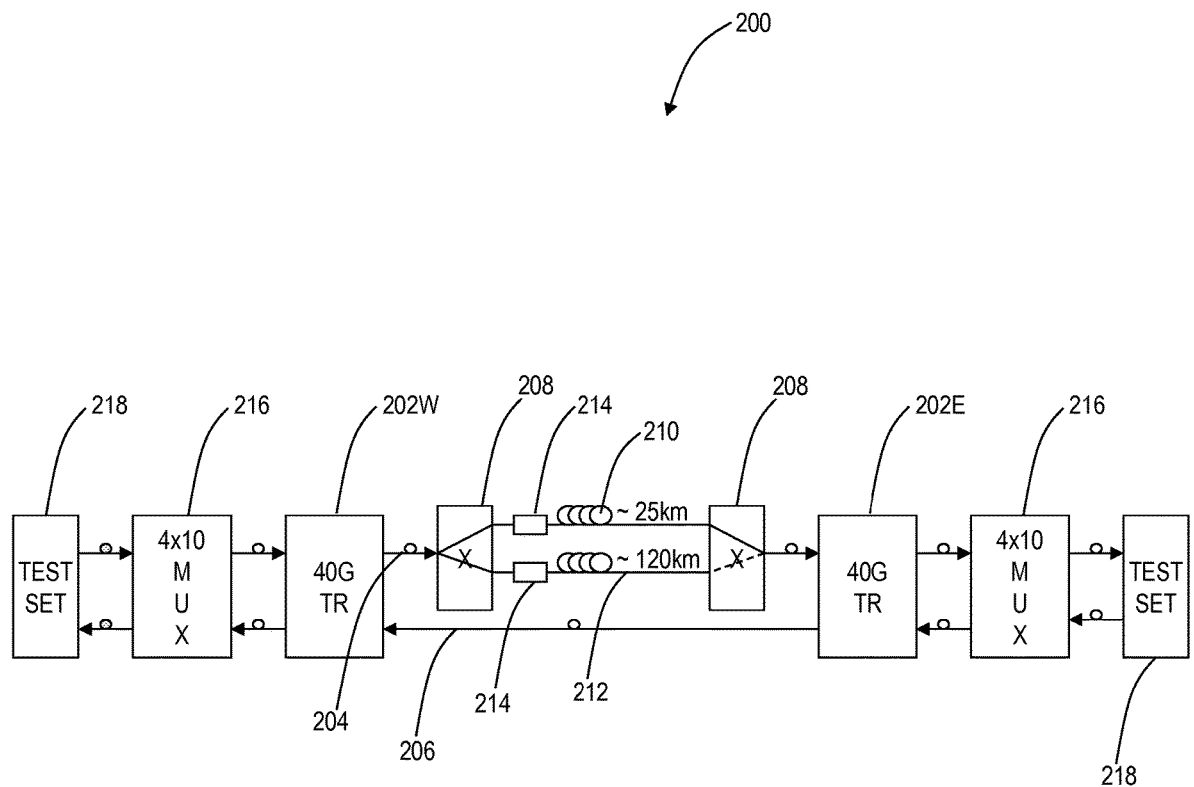
FIG. 5 is a block diagram of an exemplary optical system implementing an exemplary Level 4 recovery of the expedited acquisition engine of FIG. 2.

Referring to FIG. 4, in an exemplary embodiment, a flowchart illustrates exemplary operations 90 in the Level 5 Recovery state 62 of the expedited acquisition engine 50. First, the expedited acquisition engine 50 performs dispersion check based online clock locking strength (step 92). The expedited acquisition engine 50 then performs burst framing (step 94), clock retuning (step 96), laser tracking (step 98), and equalized coefficient tuning (step 100). Once the Level 5 Recovery state 62 has acquired the signal and the expedited acquisition engine 50 enters the traffic carrying state 52, the expedited acquisition engine 50 stores the pre-stored map which includes dispersion information, coefficient settings, laser offsets, etc. from the Level 5 Recovery state 62. As described herein, the pre-stored map may be saved in the memory of the compensation block 30 or the processor 32. Also, the pre-stored map may be shared with other coherent optical receivers 10, network management systems, etc.

The short-term optical recovery systems and methods provide a methodology to expedite acquisition in the optical coherent receiver 10. The methodology overcomes the inherent long recovery time in the optical coherent system without trading off the benefits and the robustness of the receiver. The approach is a map oriented architecture to allow storing a set of parameters including, but not limited to, equalizer coefficients, dispersion values, and frequency offsets that could be loaded when a fault scenario occurs. In addition, it deploys a wide range of hold-off optimized timers for each possible fault scenario. One use of these hold-off timers is to set the maximum amount of time that expedited acquisition tolerates before a full acquisition is triggered. Another application is hold-off time for conditioning a client card up-stream. Use of expedited acquisition minimizes the downtime of high capacity optical transport systems that are based on coherent technology.

The short-term optical recovery systems and methods can be applied to any coherent optical systems in a variety of applications/services. For example, the short-term optical recovery systems and methods provide fast line recovery for coherent 40 G/100 G (and beyond) when the line is protected, to less than 50 msec (comparable to the performance of IMDD systems). The short-term optical recovery systems and methods further provide expedited acquisition of the signal when a fault such as a fiber pinch or a short fiber cut for either protected or unprotected lines occur. For unprotected systems, this can be viewed as a fast reacquisition based on the previous map. Also, the short-term optical recovery systems and methods may provide a re-circulation tool to simulate long haul transmission and to assess performance of an optical signal when travelling along thousands kilometers of fiber (territorial or submarine networks). For example, the re-circulation tool may include a physical fiber of a specific distance, e.g. 1,000 km. To simulate the performance of a long-haul or submarine cable of 10,000 km, the re-circulation tool will cause the physical fiber to be traversed 10 times. For the physical fiber of 1,000 km, the optical coherent receiver 10 has approximately 3.3 msec to acquire the signals of each of the 10 orbits, each spaced by small frequency, e.g. 100 MHz from the others. In an exemplary embodiment, the short-term optical recovery systems and methods may be utilized in the re-circulation tool making it possible to acquire a coherent signal fast such that the re-circulation tool may use coherent modulation. Further, the short-term optical recovery systems and methods may also be adapted to focus more on the signal acquisition in an expedited manner at the expense of robustness. For example, in case acquiring the signal is missed on one orbit, the re-circulation tool may do it on the subsequent orbit. By repeating the process over and over, the re-circulation tool may gather enough performance data samples, e.g. bit error rate, etc., for each circulation, e.g. 1000 km, 2000 km, 3000 km, etc.

Referring to FIGS. 5-8, in an exemplary embodiment, an application of Level 4 recovery is illustrated by an optical system 200. In particular, the optical system 200 includes two interconnected coherent optical transceivers 202E, 202W. The coherent optical transceivers 202E, 202W are 40 G coherent modems with each including a coherent optical receiver, such as the coherent optical receiver 10. Further, the coherent optical transceivers 202E, 202W are configured to implement the expedited acquisition engine 50. The optical transceivers 202E, 202W are configured in a 1+1 line configuration with dual fibers 204, 206. From the transceiver 202W to the transceiver 202E on the fiber 204, there are optical switches 208 configured to switch between a first fiber 210 of approximately 25 km and a second fiber 212 of approximately 120 km. The fibers 210, 212 also include variable optical attenuators (VOAs) 214 at the transceiver 202W to simulate a fiber cut. From the transceiver 202E to the transceiver 202W on the fiber 206, the transceivers 202E, 202W are directly connected therebetween. Each of the transceivers 202E, 202W is coupled to a 4×10 multiplexer 216 which is coupled to a 10 G test set 218.

Figure 6:
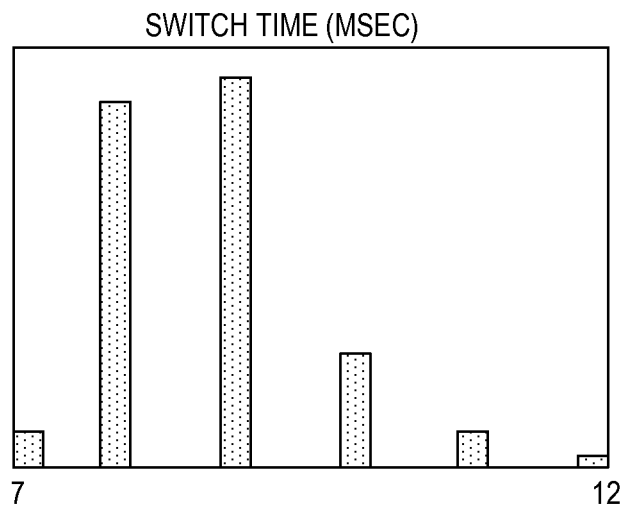
FIG. 6 is a histogram of switch times for the exemplary optical system of FIG. 5.

The optical system 200 was utilized to implement Level 4 recovery of the expedited acquisition engine 50 between the fibers 210, 212. In this exemplary operation, the fibers 210 are not matched in terms of dispersion, i.e. the working link of the fiber 210 is 25 km whereas the protection link of the fiber 212 is 120 km. The optical switches 208 are configured to perform a switching function between the fibers 210, 212, such as based on a simulated fiber cut through the VOAs 214. Specifically, upon a loss of light in the working path, the optical switches 208 switch to the protecting path. During the switch-over time, no traffic is carried, and the optical system 200 goes to a recovery mode in the expedited acquisition engine 50. FIG. 6 shows a histogram of switch-over (or fiber cut times) associated with the optical switches 208. As seen the average switch-over time is between 7 and 12 msec.

Figure 7:
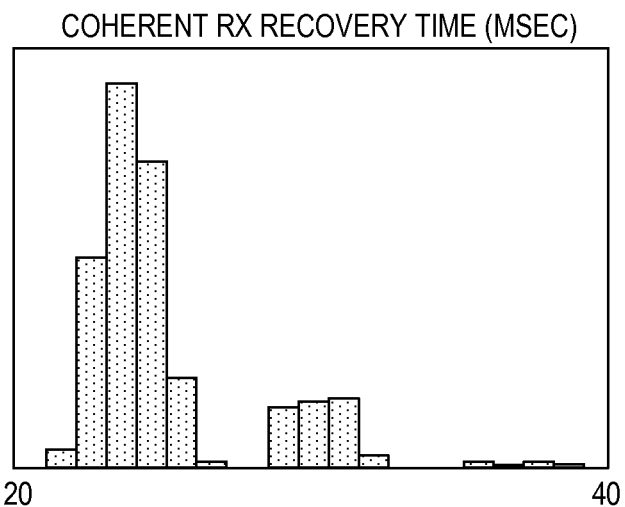
FIG. 7 is a histogram of coherent receiver recovery times for the exemplary optical system of FIG. 5.
Figure 8:
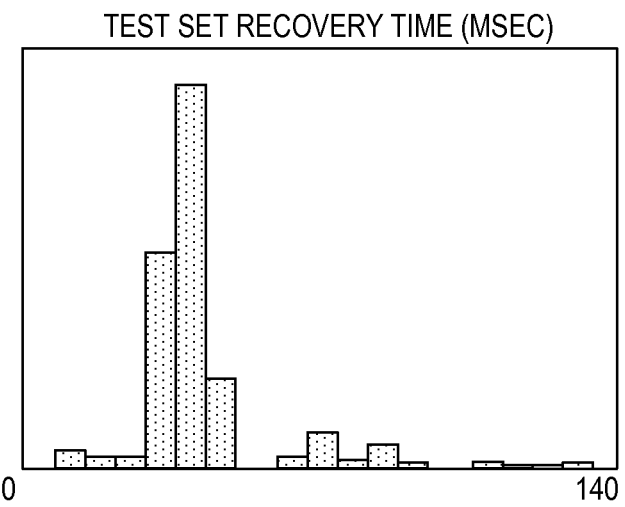
FIG. 8 is a histogram of end-to-end recovery times at a test set for the exemplary optical system of FIG. 5.

Using the expedited acquisition engine 50, FIG. 7 shows a histogram of the total recovery time for the optical system 200 which includes the fiber cut/switch-over times from FIG. 6. As seen, the overall loss of traffic for switching to the protection path is between 20 to 40 msec. About 7 to 12 msec of the traffic loss is attributed to fiber cut time or switch over time. Excluding fiber cut time, the expedited acquisition engine 50 offers on average a recovery time for a coherent engine of significantly less than 50 msec. FIG. 8 shows a histogram of overall, end-to-end recovery time at the test sets 218. Note, a client card's recovery, and conditioning time is design specific and may need its own optimization. For illustration purposes, the test sets 218 show a recovery, on average, of less than 50 msec. It should be noted that with optimization of a client card, e.g., proper messaging between client card and 40 G coherent system, the variation in overall recovery time could be significantly reduced and bring overall end-to-end recovery very close to that of coherent engine. Another note is that the end-to-end recovery time prior to applying the method had been 750 msec to 1500 msec with the average around 950 msec, with most of the time in the coherent signal recovery.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method implemented in a coherent optical receiver, the method comprising:
 detecting a fault in the coherent optical receiver requiring signal reacquisition;
 determining a type of the fault, wherein the fault is any of a fiber pinch, a fiber cut, and a switch-over to another fiber resulting in the type being any of a filter error, a plurality of filter errors, and a complete loss of light, and implementing expedited acquisition to perform the signal reacquisition by performing one of the following based on the determined type of the fault
 a. when the type is the filter error and no loss of light from a traffic carrying state, readjusting a filter associated with the filter error;
 b. when the type is the plurality of filter errors and no loss of light, readjusting each of a plurality of filters associated with the plurality of filter errors;
 c. when the type is the complete loss of light or there is a failure to solve the filter error in step a or the plurality of filter errors in step b., loading operational data to perform signal reacquisition, wherein the operational data is utilized to speed up the signal reacquisition relative to a full signal reacquisition and the operational data is determined based on the traffic carrying state; and
 d. when the type is the complete loss of light or there is a failure of the operational data in step c., performing the full signal reacquisition.

2. The method of claim 1, further comprising:
 compensating a digital stream of an optical signal to one or more of recover a reference clock, remove chromatic dispersion, and to remove polarization dispersion.

3. The method of claim 1, further comprising:
 subsequent to the readjusting in step a., performing one of recovering back to the traffic carrying state or performing the readjusting in step b.

4. The method of claim 1, further comprising:
 subsequent to the readjusting in step b., performing one of i. recovering back to the traffic carrying state or ii. performing the loading in step c. or the full signal reacquisition in step d.

5. The method of claim 1, wherein the step c. further comprises, subsequent to the loading operational data:
  locking a clock, and if unable to achieve a lock, proceeding to the step d.; and
  performing expedited burst framing, clock realignment, convergence of the plurality of filters, and expedited laser tracking.

6. The method of claim 1, wherein the step d. further comprises:
  scanning dispersion, performing burst framing, performing clock retuning, performing laser tracking, and performing coefficient tuning for the plurality of filters.

7. The method of claim 6, further comprises:
  subsequent to recovery from the step d., saving associated data as the operational data.

8. The method of claim 1, further comprising:
  switching from one fiber to another fiber and performing the step c. with operational data of the another fiber.

9. A coherent optical receiver comprising:
  a compensation block of electrical circuitry comprising a plurality of filters, wherein the compensation block is configured to receive a stream of digital samples of an optical signal and to provide a compensated stream; and
  a processor configured to detect a fault in the coherent optical receiver which requires signal reacquisition and determine a type of the fault, wherein the fault is any of a fiber pinch, a fiber cut, and a switch-over to another fiber resulting in the type being any of a filter error, a plurality of filter errors, and a complete loss of light, and to implement expedited acquisition to perform the signal reacquisition, the expedited acquisition engine is configured to perform one of the following based on the determined type of the fault
    a. when the type is the filter error and no loss of light from a traffic carrying state, readjust a filter associated with the filter error,
    b. when the type is the plurality of filter errors and no loss of light, readjust each of a plurality of filters associated with the plurality of filter errors,
    c. when the type is the complete loss of light or there is a failure to solve the filter error in step a. or the plurality of filter errors in step b., load operational data to perform signal reacquisition, wherein the operational data is utilized to speed up the signal reacquisition relative to a full signal reacquisition and the operational data is determined based on the traffic carrying state, and
    d. when the type is the complete loss of light or there is a failure of the operational data in step c., perform the full signal reacquisition.

10. The coherent optical receiver of claim 9, wherein the processor is further configured to
  compensate a digital stream of an optical signal to one or more of recover a reference clock, remove chromatic dispersion, and to remove polarization dispersion.

11. The coherent optical receiver of claim 9, wherein the processor is further configured to
  subsequent to readjustment in step a., perform one of recover back to the traffic carrying state or perform the readjustment in step b.

12. The coherent optical receiver of claim 9, wherein the processor is further configured to
  subsequent to readjustment in step b., perform one of i. recover back to the traffic carrying state or ii. perform step c. or the full signal reacquisition in step d.

13. The coherent optical receiver of claim 9, wherein the step c. comprises, subsequent to the operational data being loaded:
  lock a clock, and if unable to achieve a lock, proceed to the step d., and
  perform expedited burst framing, clock realignment, convergence of the plurality of filters, and expedited laser tracking.

14. The coherent optical receiver of claim 9, wherein the step d. comprises
  scan dispersion, perform burst framing, perform clock retuning, perform laser tracking, and perform coefficient tuning for the plurality of filters.

15. The coherent optical receiver of claim 14, wherein, subsequent to recovery from the step d., associated data is saved as the operational data.

16. The coherent optical receiver of claim 9, wherein the processor is further configured to
  subsequent to a switch from one fiber to another fiber, perform the step c. with operational data of the another fiber.

17. The coherent optical receiver of claim 9, wherein the optical signal is modulated with any of quadrature amplitude modulation (QAM), differential phase shift keying (DPSK), differential quadrature phase shift keying (DQPSK), orthogonal frequency-division multiplexing (OFDM), and polarization multiplexing with any of the foregoing.

18. A system comprising:
  electrical circuitry comprising a plurality of filters, wherein the electrical circuitry is configured to receive a stream of digital samples of an optical signal and to provide a compensated stream;
  wherein the electrical circuitry is configured to
    perform compensation of the stream of digital samples,
    detect an error in the compensation due to a fault in the coherent optical receiver which requires signal reacquisition,
    determine a type of the fault, wherein the fault is any of a fiber pinch, a fiber cut, and a switch-over to another fiber resulting in the type being any of a filter error, a plurality of filter errors, and a complete loss of light, and
    implement an expedited acquisition engine to perform the signal reacquisition based on the determined type of the error, wherein the expedited acquisition engine performs a recovery associated with the determined type, wherein the type of the error comprises one of a plurality of error types, and wherein each type of the plurality of error types has a different recovery performed to address a different type, wherein, in at least one of the different recovery utilizes pre-stored operational data to reacquire the optical signal without having to resort to full reacquisition, and wherein the recovery is performed based on the fault.

19. The system of claim 18, wherein the pre-stored operational data is further utilized to reacquire the optical signal subsequent to a switch from one fiber to another.

20. The system of claim 18, wherein the optical signal is modulated with any of quadrature amplitude modulation (QAM), differential phase shift keying (DPSK), differential quadrature phase shift keying (DQPSK), orthogonal frequency-division multiplexing (OFDM), and polarization multiplexing with any of the foregoing.

* * * * *